Oct. 22, 1968   E. J. JOFFE   3,406,480
TOY VEHICLE
Filed April 5, 1966   2 Sheets-Sheet 1
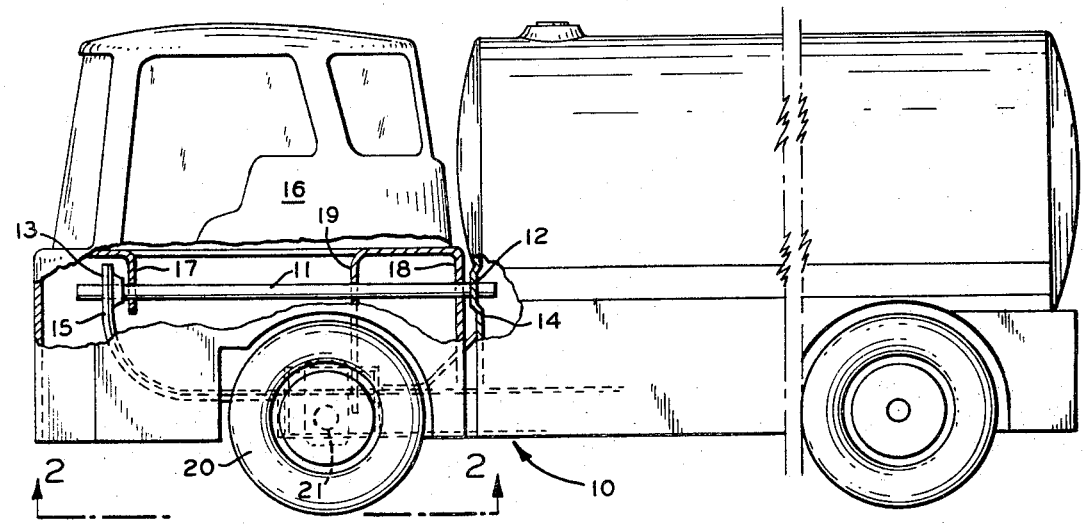
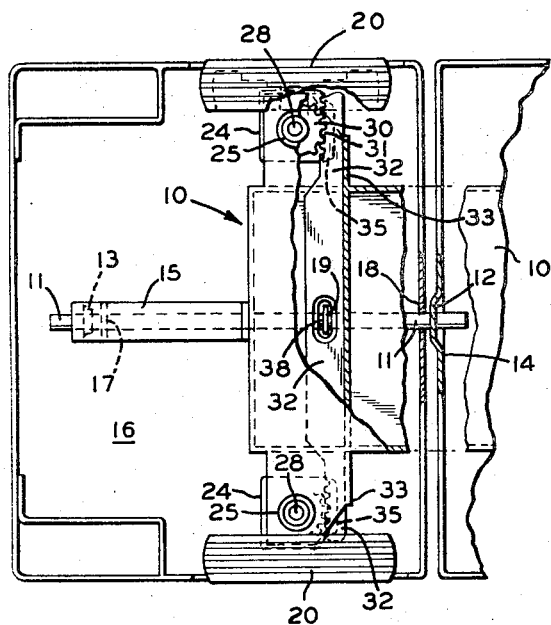
INVENTOR.
EDWARD J. JOFFE
BY
ATTORNEY.

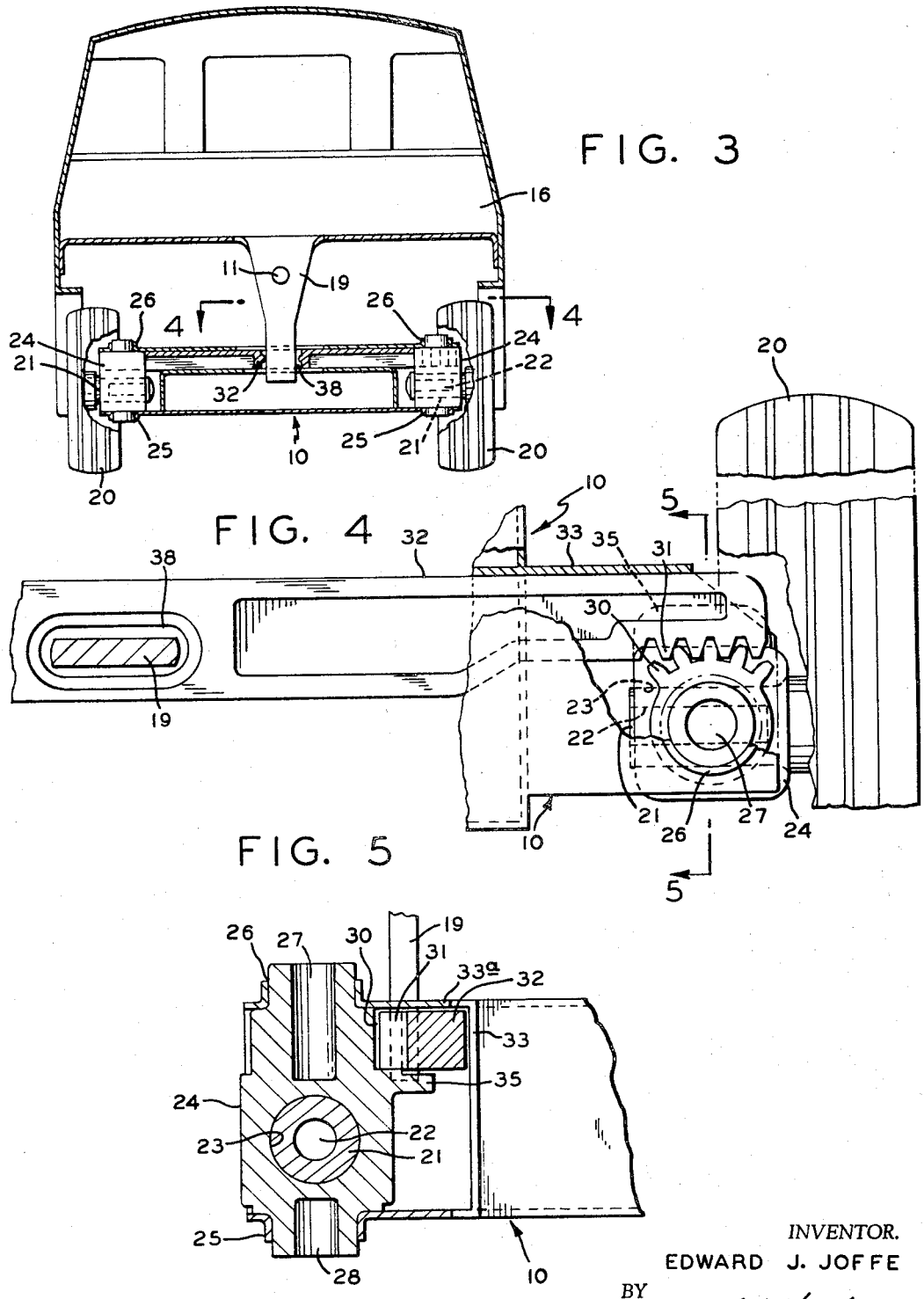

United States Patent Office 3,406,480
Patented Oct. 22, 1968

3,406,480
TOY VEHICLE
Edward J. Joffe, Summit, N.J., assignor to Park Plastics Co., Inc., Linden, N.J., a corporation of New Jersey
Filed Apr. 5, 1966, Ser. No. 540,238
4 Claims. (Cl. 46—201)

ABSTRACT OF THE DISCLOSURE

A toy vehicle has two steered wheels, each of which is pivoted on a vertical steering axis through a shaft having a portion thereof formed as a pinion. A rack bar has rack teeth at each end in engagement with the pinions of both shafts, the rack bar being movable transversely of the vehicle in a guided path. The vehicle has a cab pivoted thereon so as to swing on an axis longitudinal of the vehicle and when it swings on this axis, it moves the rack bar to steer the vehicle through actuation of the pinions.

This invention relates to a steering mechanism for toy vehicles. More particularly, it relates to a steering mechanism of the type in which the steering wheels are moved through the tipping of a part of the vehicle relatively to the remainder of the vehicle. More particularly, the invention relates to a toy vehicle in the form of a tank truck, in which the cab of the truck is pivoted relatively to the remainder of the truck about a longitudinal axis, and when so tripped, actuates the steering mechanism.

Vehicles of the particular class, equipped with steering mechanism such as outlined by me, are quite old in the art. However, these steering mechanisms have not been successful because their construction permits a certain looseness which makes extremely difficult the effective operation of the mechanism. Moreover, the actuating means used in the prior art are so constructed that they do not operate efficiently and effectively under the hard usage to which toy vehicles of the class are subjected.

As an example, some toy vehicles of the prior art utilize pivoted steering wheels that are adapted to be actuated through means of a tie rod pivoted to each steering wheel. The swinging tie rod is, in turn, actuated in a rather inefficient manner by the movement of the cab. Because the tie rod must swing, and must operate through pivots which are exposed, and is at the same time moved by a rod or lever that has straight line motion, it is obvious that the mechanism will fail.

In the mechanism that I have contrirbuted, there are no connecting pivots whatsoever in the steering mechanism. Further, the actuating means for the two steering wheels take the form of a rack bar that moves in a straight line for extremely efficient operation and coacts with a rod extending from the cab of the vehicle. The rod moves in a vertical plane and in the same straight line as does the rack. Through the maintenance of the rack always in engagement with pinions carried by each wheel in the steering axis of each wheel, all pivot connections of the prior art are eliminated and, of course, it is obvious that the rack is easily maintained in engagement with the pinions, all without exposed fastening means or pivot connections of any sort.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings, FIGURE 1 is a vertical view and partial section of a tank truck in which my invention is incorporated;

FIGURE 2 is a view taken upwardly, along lines 2—2 with certain parts broken away to better illustrate the construction;

FIGURE 3 is a vertical partial section illustrating the connection between the rod extending downwardly from the cab and the rack of my invention;

FIGURE 4 is a section taken along lines 4—4 of FIGURE 3 showing the rack and pinion construction in enlarged form; and FIGURE 5 is a section taken along lines 5—5 of FIGURE 4.

Referring now more particularly to the drawings, the toy vehicle of my invention takes the form of a tank truck having a chassis designated generally by reference numeral 10. A cab supporting shaft 11 may be mounted on the chassis in any desired manner as those skilled in the art will appreciate. In one form of my invention, the shaft 11 may be loosely mounted on the chassis at 12 and 13 through use of brackets or other supports 14 and 15. The cab 16 is formed with a depending plate 17 at its forward end and through which it is pivotally mounted on the supporting shaft 11. At the rear, the cab 16 is formed with a depending plate 18 through which it is mounted on the shaft 11. Extending vertically downwardly from the cab is a rod 19, which I term a steering rod, and which is preferably in the form of a narrow plate, as can best be seen in FIGURES 2, 3 and 4.

Referring now more particularly to FIGURES 4 and 5, I shall describe the construction of one of the steering wheels of the vehicle and the manner in which it is steered, it being understood that the wheels are identical and that the steering mechanism is identical. The wheel shown in FIGURE 4 is designated by reference numeral 20, and it has an integral shaft 21 that is hollow, as indicated at 22. This shaft is forced into an opening 23 in a shaft 24, which I term a stub shaft. Stub shaft 24 is mounted at 25 and 26 relatively to suitable openings formed by portions of the chassis 10. The purpose of the particular construction is to mount the stub shaft 24 for rotation in a vertical axis relatively to the chassis 10. The particular form of the mounting means of the chassis are not important, it being obvious that nothing more is required than a vertical mounting for the stub shaft 24. It will also be appreciated that the stub shaft 24 is formed of a plastic material so that the opening 23 may readily accept the shaft 21 of the wheel 20. The openings 27 and 28 in the stub shaft are for the purpose of lightening the shaft and conserving plastic material.

Formed integral with the stub shaft 24 is a pinion 30, shown best in FIGURE 4, and in contact with the teeth of the pinion 30 are teeth 31 of a steering rack 32. It will be noted that the chassis 10 is so constructed that the portion 33 thereof, used for holding in position the stub shaft 24, is also utilized for the purpose of holding the rack 32 so that its teeth 31 are maintained in engagement with the teeth of the pinion 30 of the stub shaft 24. It will also be noted that the rack bar 32 is held effectively in a position relatively to the stub shaft through utilization of a shoulder 35 on the stub shaft 24, between which and the upper flange 33a of the chassis portion 33, the rack is maintained. In other words, without the use of any fasteners or pivots or any other means subject to destruction, the steering stub shaft 24 is effectively steered through the use of the rack bar 32, with the rack bar effectively held in position for steering the stub shaft under all conditions.

Midway of the rack bar 32, there is formed an opening 38 and in this opening is positioned the steering rod 19. Because of the particular mounting of the rack bar 32, it is adapted for movement in a straight line transversely of the truck chassis and at right angles to the cab supporting shaft 11 which is mounted centrally of the longitudinal axis of the truck. The steering rod 19 moves in a vertical plane and in a straight line exactly parallel to the movement of the steering rack 32, so that the engagement between the steering rod 19 and the end surfaces of opening 38 of the steering rack 32 is always correct, and steering is effected with a minimum of friction.

In another form of my invention, the cab supporting shaft 19 may take the form of a torsion rod secured at one end to one of the brackets 14 or 15 while loose relatively to the other of the two brackets. One of the plates 17 or 18 of the cab may be fixed relatively to the shaft 11 so that the shaft 11 may function as a spring torsion rod resisting movement of the cab in the axis of the shaft 11. Of course, friction may normally be used to hold the cab firmly in any position to which it is tilted in the axis of shaft 11.

I believe that those skilled in the art and fully understanding the development of the art, will now appreciate the nature of my invention and its contribution to this art.

I now claim:
1. In a toy vehicle, a chassis frame, a cab supporting shaft mounted longitudinally of said frame in the central axis thereof, a driver cab mounted on said shaft for pivotal movement in the axis of said shaft, a pair of opposed steering wheels, stub shafts mounting said wheels for steering rotation relatively to said chassis on parallel vertical axes, pinion sections integral with said stub shafts, a rack bar mounted on said chassis in position for movement transversely of said chassis at right angles to said cab supporting shaft with the teeth of said rack engaged with the teeth of each of said pinions, means retaining said rack bar in said position, and a steering rod extending downwardly from said cab such that when said cab is manually pivoted about the axis of said cab supporting shaft, said steering rod contacts said rack and moves said rack laterally, thereby rotating the stub shafts and causing the wheels to turn.

2. In claim 1, the feature that the cab rotates integrally with said shaft and with said shaft acting as a torsion spring.

3. In claim 1, the feature that said rod moves in a slot formed midway of said rack.

4. In claim 1, the feature that said rack bar is held in position by coaction of a part of said chassis frame and by a portion of each stub shaft below the pinion.

References Cited
UNITED STATES PATENTS

| | | | |
|---|---|---|---|
| 2,386,745 | 10/1945 | Yarbrough | 46—201 |
| 2,888,778 | 6/1959 | Carter | 46—201 |
| 3,063,194 | 11/1962 | Berguerand | 46—201 |
| 3,144,731 | 8/1964 | Jones et al. | 46—201 |

LOUIS G. MANCENE, *Primary Examiner.*

C. R. WENTZEL, *Assistant Examiner.*